United States Patent Office 3,178,868
Patented Apr. 20, 1965

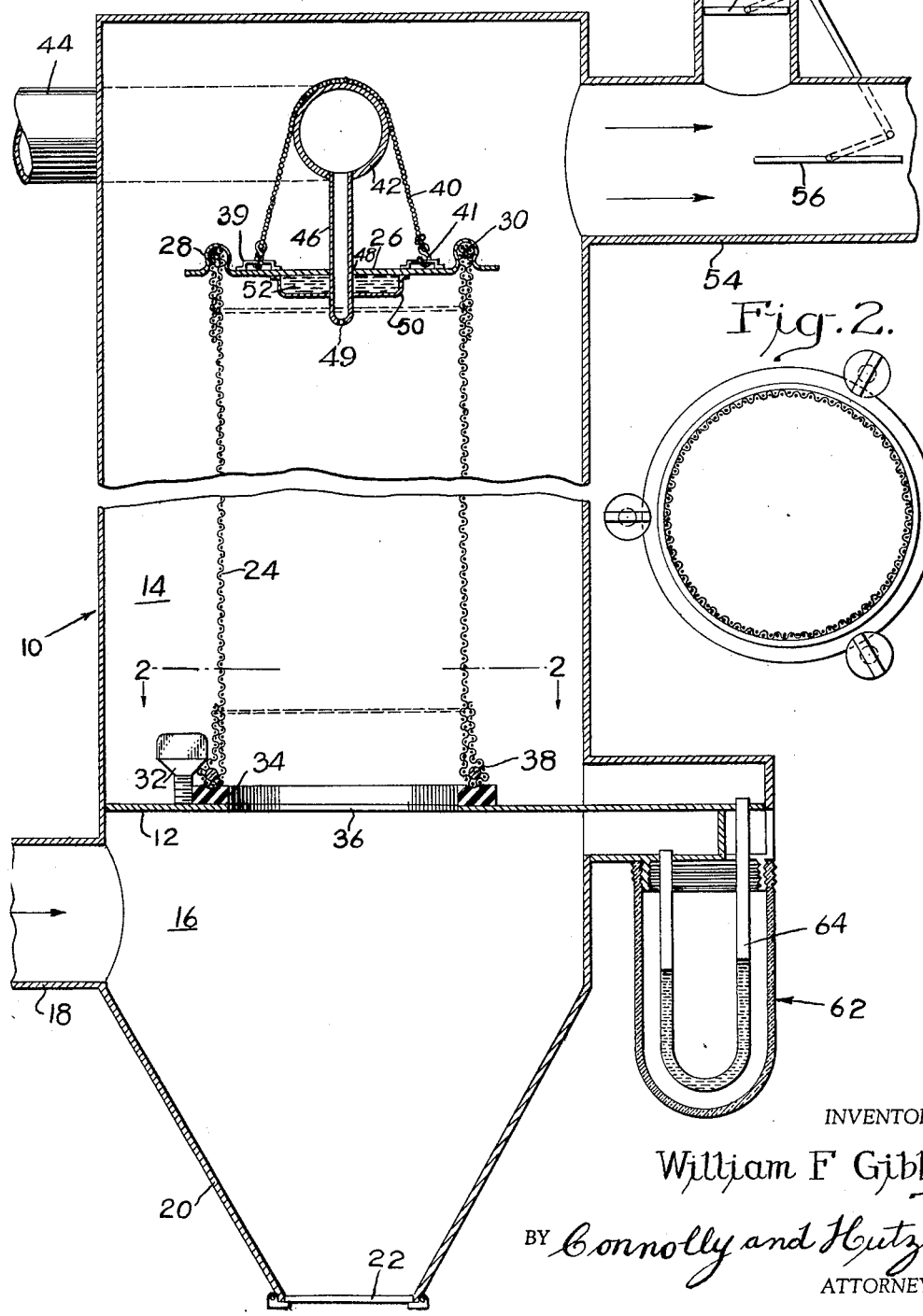

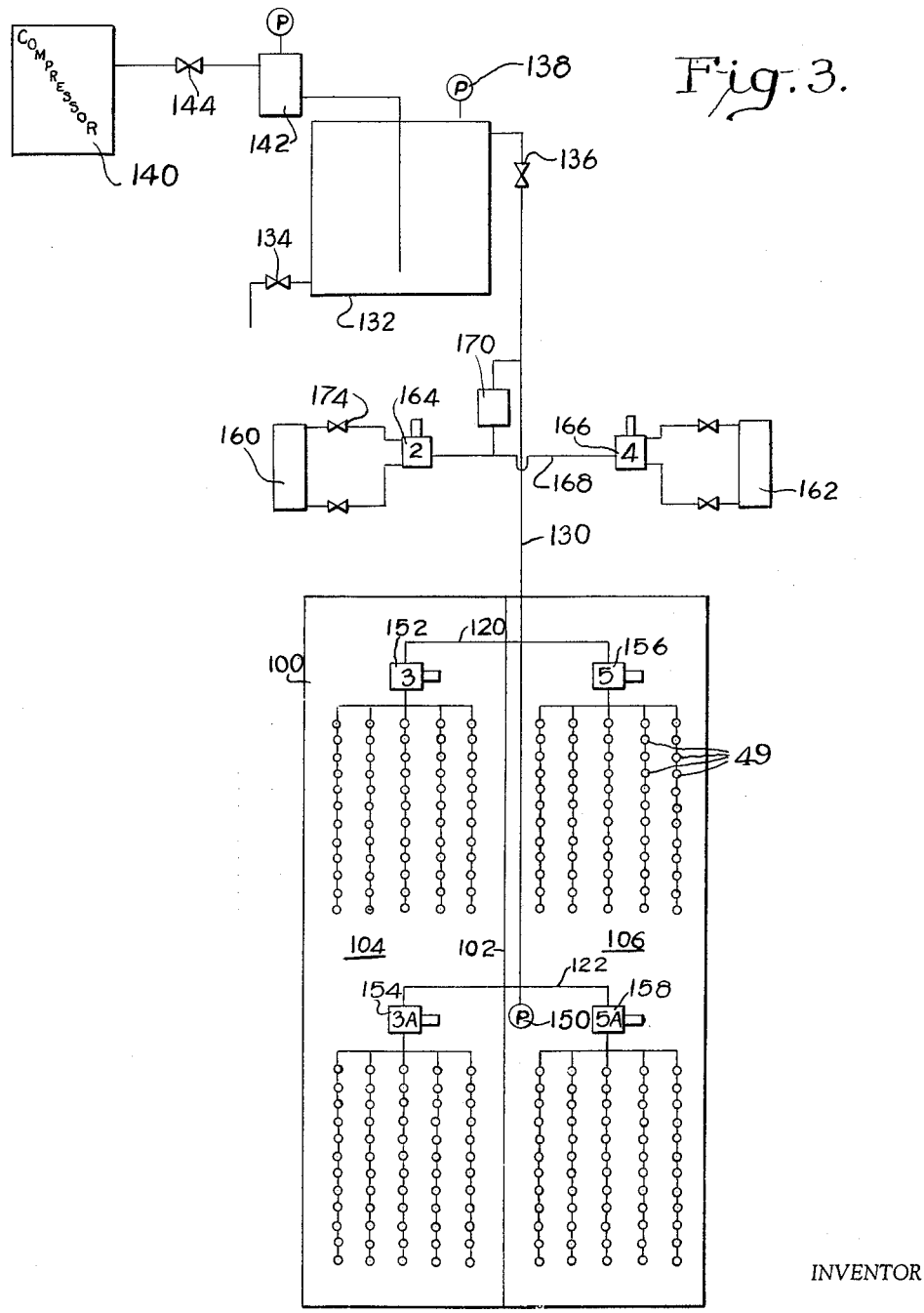

3,178,868
DUST FILTER WITH PRESSURE JET CLEANING
William F. Gibby, Hagerstown, Md., assignor, by mesne assignments, to The Pangborn Corporation, Hagerstown, Md., a corporation of Delaware
Filed July 6, 1959, Ser. No. 825,097
7 Claims. (Cl. 55—96)

The present invention relates to dust filters that can be used substantially continuously and to this end are self-cleaning.

While self-cleaning dust filters have been extensively used in the prior art, such use has been complicated by the fact that the self-cleaning operations either cause excessive wear of the filter elements or associated portions of the apparatus, or practical constructions are quite complicated and expensive.

Among the objects of the present invention is the provision of novel self-cleaning dust filters as well as cleaning methods which avoid the above difficulties.

These as well as further objects of the present invention will be more clearly understood from the following description of several of its exemplifications, reference being made to the accompanying drawings where:

FIG. 1 is a vertical sectional view of one form of self-cleaning dust filter according to the present invention;

FIG. 2 is a sectional view of the construction of FIG. 1 taken along the line 2—2; and FIG. 3 is a schematic plan view of a multi-unit filter showing more of its operating elements.

According to the present invention, a dust filter has an elongated filter tube with a yieldable textile wall construction, the tube being supported essentially only at its ends in a generally upright position in a housing and connected to receive a stream of dusty gas at its lower end to cause the gas to pass through the tube while the dust is trapped on the inner surface of that wall, a substantially rigid downwardly directed gas nozzle in the upper end of the tube, and connection elements for intermittently connecting the nozzle to a source of gas under pressure to cause the nozzle to direct the compressed gas downwardly at the tube's inner surface to loosen the dust trapped thereon and to cause the compressed gas stream to develop inwardly directed pressure around the top portion of the tube, the mounting of the tube providing a tension sufficiently low to allow this inwardly directed pressure to draw inwardly the top of the tube and thereby speed up the loosening of the dust.

The housing for the filter tube can also be provided with a reverse gas flow mechanism to direct gas inwardly through the tube wall from the housing around it when the compressed gas is introduced.

Dust filters of the above type are very effectively cleaned by the downwardly directed gas jets, particularly by reason of the inwardly drawing action they have on the upper portion of the filter tubes. The tube is subjected to substantially no abrasion and therefore has an unusually long life. The system is accordingly particularly suited for filtering very hot gases with tubes made of glass fiber textile. Such textiles are extremely sensitive to mechanical deterioration and abrasion, and will fail very rapidly even with what might seen very minor rubbing, but in the above combination can be operated through many hundreds of cleaning cycles without showing any sign of wear.

After a momentary downward jet of cleaning gas, a short settling period to allow the loosened dust to settle out through the lower end of the tube is all that is needed to make the tube ready for continued dust filtration. The reversing of the gas flow through the tube wall even further improves the cleaning action, still without any appreciable abrasion of the tube wall. Best results are obtained by repeating momentary downwardly directed jets one or more times after short settling periods.

Turning now to the construction of the drawings, that of FIG. 1 includes an elongated housing 10 extending in a vertical direction with a generally horizontal partition 12 near the bottom dividing it into upper and lower compartments 14 and 16 respectively. The lower compartment 16 is a dusty gas portion of the housing, receiving a stream of dust-containing gas through a side inlet 18 connected for instance to the dried kiln exhausts of a cement plant, or the carbon collectors in carbon black plants where the carbon is removed from the combustion products in which it is formed, or the exhaust of a smelter or metal refiner. Compartment 16 tapers down to a hopper bottom 20 into which the dust particles settle down as the gas flows through as well as when the filter is being cleaned. A dump gate 22 can be provided to empty the settled dust when it accumulates to a sufficient degree.

In the clean gas compartment 14 there is mounted a filter tube 24 of porous textile material shown as supported at its top by a sheet metal head 26 having a downwardly facing groove 28 in which the tube top is crimped. To better secure the tube top in place, it is hemmed over a stiff metal ring or cord 30. If a cord is used it can be made of the same or similar fibers as that which the tube is composed of. The lower end of tube 24 is secured by a set of three screw clamps 32 against a gasket or sealing ring 34 fastened around an opening 36 in the partition 12. For this purpose a stiff ring 38 is hemmed at the bottom of the tube so that the spaced clamps will seal it securely to the support over the entire periphery.

The head 26 is suspended by a chain 40 from a rigid pipe 42 that extends through the housing wall to which it can be fixed, and connects to a source 44 of gas under pressure. A valve, preferably of the quick-operating type such as a solenoid-controlled construction, is inserted in pipe 42 or source 44. A nozzle 46 communicates with pipe 42 and penetrates through an opening 48 in head 26 to open at jet outlet 49 in downwardly facing position in the top of the tube 24. The nozzle is a loose fit in the head opening 48, so that the head can be easily slipped on or off when a filter tube is to be removed or remounted. To seal this joint, a packing gland can be supplied as for example in the form of a retainer 50 fastened to the top or bottom surface of the head and holding a packing gasket or set of gaskets 52 around the opening 48.

The flow circuit for the dust-laden gas is completed by an outlet duct 54 opening into the clean gas compartment 14 and leading to a clean gas discharge. A damper 56 can be connected in this duct to partially or completely close it if desired. The stream of dust-laden gas supplied to the filter can be impelled by a blower having its suction end connected to duct 54 and its outlet end vented to the atmosphere, or by a blower having its outlet end connected to line 18 and its inlet end to the above-mentioned source of dust-containing gas, or by both types of connection. In addition, duct 54 can be provided with a side inlet 58 controlled by a separate damper 60 to provide a source of gas for the reverse flow through the wall of filter tube 24. Inlet 58 can be merely left open to the air and damper 60 can be connected for operation simultaneously with damper 56 as illustrated, so that the damper 60 automatically opens when damper 56 is closed. In this way, by having a plurality of assemblies 10 connected in parallel so that all their dust-containing gas inlets 18 open to the same source of dust-containing gas and all their out-flow ducts 54 are connected to the suction end of the same or separate blowers, the closing of damper 56 in one of these assemblies will automatically terminate the flow of dust-laden gas in the filtering direction and at the same time open inlet 58 so that ambient air or air at elevated temperatures will be sucked in the reverse flow direction through the interrupted assembly by reason of the suction applied to the source of dust-laden gas through the remaining filter assemblies of the parallel connected group.

This construction also includes a pressure measuring device represented at 62 connected to indicate the difference in gas pressure between the clean and dusty gas compartments. This can be a simple manometer tube 64 having its ends opening into the respective compartments and partially filled with a liquid like oil.

In operation damper 60 is closed, damper 56 opened, and the stream of dusty gas to be filtered is established. The dust is trapped by the filter tube wall through which the stream passes. The pressure indicator 62 shows the difference between the gas pressures inside and outside the tube, thus serving as a measure of its effectiveness. When so much dust is trapped that the pressure differential gets too high, a reverse gas flow is established by closing damper 56 and one or more pulses or puffs injected through nozzle 46. These pulses need be for no more than about two seconds each.

One significant effect of the downward pulse of gas is that it causes the top of the tube to be drawn inwardly towards the end of the nozzle 46 by reason of the suction action of the jet. The tube should be hung without too much tension between the head 26 and the tube so that the tube is not restrained unduly. The weight of the tube itself does not cause any undue restraint inasmuch as it takes a tension of at least about one pound per lineal inch of mounting periphery to begin to have any restraining effect and textile filter tubes, even when of heavy textile such as glass fiber cloth, at most only weighs about two ounces per lineal inch of mouth periphery when 25 feet long.

After the pulses or puffs, a short settling period, generally about three seconds at least, is provided to enable the drawn in tube top to return to its normal position. When reverse gas flow is also used, the tube is kept contracted over substantially its entire length by the squeezing effect of the inwardly directed reverse gas pressure, so that this is the condition to which the tube returns when the pressure pulse is over.

Another effect of the pressure pulse when reverse flow is used is to open up the bottom of the tube against the collapsing action of the reverse flow. This also helps loosen dust trapped in the tube wall.

When the pulse of gas is over, a wait of as long as one-half minute or more can be provided to make sure the loosened dust falls down into the hopper 20. Less settling time is needed if reverse gas flow is used. Immediately after settling, the equipment is ready for further filtering. Best results are obtained with a succession of pressure pulses, about 5 or 6 each 4 or 5 seconds apart has proven exceedingly effective.

The pressure pulses referred to above should be at least about ¼ second long when measured at the nozzle. A longer time may be needed if the timing is carried out some distance up stream from the nozzle, particularly where a large manifold connects the timing station with the nozzles.

The cleaning action can also be made automatic as by using the pressure indicator 62 to trigger the cleaning sequence. The manometer liquid or a separate dry pressure-sensitive switch can thus be made to close a circuit that actuates a cycling timer equipped with the appropriate control switches. At the completion of the timer cycle the filtering action is restored.

A pressure of only about five pounds per square inch (gauge) in the compressed gas source is sufficient to give very effective cleaning with a nozzle having a cross-sectional area of 0.049 square inch. Approximately the same cleaning action results with a pulse from such nozzle when the tubes vary in diameter from six inches to twelve inhces. The tubes can be circular, elliptical, polygonal or of any other sectional shape without appreciable change in cleaning effectiveness. The tubes can also be connected together as in U.S. Patent 2,612,236 granted September 30, 1952. Any kind of textile wall construction is cleaned in this way, cotton, wool, polyamide fibers, polyacrylonitrile fibers, asbestos, glass or even metal fibers being typical examples. The filter tube needs no supports, either internal or external, between the above upper and lower attachments. In fact, additional supports are undesirable because they cause premature failure through chafing of the tube wall. It will be noted that the construction illustrated in FIG. 1 has no mechanical contact with the filter tube except at its very ends where there is very little movement between the tube and its attachment members.

Higher or lower pressures can also be used for the compressed gas source. Pressures as low as one-half pound per square inch or even six inches of water, can be used in this way. In general, it appears that corresponding cleaning action is obtainable with pressure puffs that discharge the same weight of gas; that is a ½ pound per square inch pressure through a nozzle having a cross-sectional area of about ¾ square inch is equivalent to a pulse under a pressure of 10 pounds per square inch through a nozzle having a cross-sectional area of 0.13 square inch. The lower pressures are particularly desirable because they can be directly provided by centrifugal or positive pressure blowers and accordingly dispense with high pressure equipment including the storage tanks generally needed with high pressures only intermittently used. On the other hand, where higher pressures are available, they can also be used and are somewhat more thorough in cleaning action.

A feature of the present invention is the simple mounting structure used for the top of the filter tubes, as described in connection with FIG. 1. In this connection the metal head 26 can be an ordinary lid of a friction-type can. Such lids have a groove defined by a rib extending circularly near their outer periphery, and this groove is conveniently shaped to receive the hemmed end of the tube. The walls of the groove can then be crimped together as by means of opposing jaws, one fixed and snugly received within the space centrally of the rib, the other of the multiple segment type compressed around the outer wall of the rib so as to squeeze both walls against the fixed jaw.

The retainer 50 as well as loops for carrying chain 40 can be very simply spot-welded or otherwise secured in place. The chain itself is preferably of the easily disconnected type such as of the metal bead and link variety, and for simpler manipulation can have an S-type hook 41 secured to one or both ends. If the hook is only provided at one end, the other end of the chain can be permanently secured in place as by providing it with an end loop through which the body of the chain is passed after it is passed under the supporting strap 39. The other end of the chain can be similarly fastened to the S hook.

Although a single filter tube is shown in the housing 10 of FIG. 1, a number of such tubes can be placed in a single housing in the interest of economy. In addition, the cleaning action of the jet or bursts of compressed gas seems to extend a considerable distance. The individual tubes can accordingly be made at least as long as eight feet and preferably even longer inasmuch as the cleaning action will be about as efficient with 25 foot tubes as it is with 6 foot tubes. The added length does not require any greater volume of compressed cleaning gas; three ¼ second pulses through a circular nozzle ⅛ inch in diameter using compressed air at ten pounds per square inch gauge pressure is about the minimum that will be effective for a good cleaning of a 6 foot tube six inches in diameter, and the same will be just as effective to clean a 12 foot tube six inches in diameter.

FIG. 3 shows a typical arrangement in accordance with the present invention where a multiplicity of filter tubes is provided. A housing 100 is divided by partition 102 into two relatively long narrow chambers 104, 106. Each chamber has 120 filter bags arranged in five rows of 24 bags each, each bag provided with its own jet 49. In this embodiment each set of 120 bags is divided into two equal parts with a separate compressed gas manifold 120, 122 for each part. A main conduit 130 connects the manifolds to a storage tank 132 through a control or pressure regulator valve 136. The tank which can have a drain 134 and pressure gauge 138, is fed by a compressor 140 through a flow meter 142 and if desired, a shut-off valve 144. A pressure gauge 150 can also be placed at the remote end of the main conduit 130 or of one of the manifolds so as to be able to detect undesirable variations in pressure in these manifolds. Solenoid valves 152, 154, 156, 158 control the flow of compressed gas to each assembly of bags and can be operated by any type of manual or automatic arrangement such as a cycling switch connected to a timer.

In the construction of FIG. 3, each chamber 104, 106 has its own set of dampers such as those illustrated at 56 and 60 in FIG. 1. In the respective chambers the dampers are linked together as in FIG. 1, and are operated by pneumatic cylinders 160, 162 respectively. The cylinders are of the reciprocating type under the control of solenoid selector valves 164, 166 connected as by gas line 168 and a lubricator 170 to the main conduit 130. Settable needle valves 174 can be inserted in the supply lines to the pneumatic cylinders for the purpose of limiting the maximum air supply rate.

Although not absolutely essential, the lubricator supplies small amounts of lubricant such as oil to the cylinders as they are operated, and can therefore compensate for any oil losses these cylinders suffer in use. Care should be taken to make sure the oil make-up is kept out of the filter tubes unless there is a separate provision for introducing solid absorbents or similar filter aid materials into the filter tubes or their intake conduits to absorb oil or other particles that tend to clog or gum up the filter surfaces. Ground stone, carbon black and the like are effective for this purpose. Filter aids can also be used to decontaminate or chemically deactivate gas streams, as by reacting with fluorine or active fluorides to prevent such chemicals from attacking the filter surfaces. Ground silica or limestone are suitable for this purpose.

The chambers 104 and 106 can have their filter tubes cleaned at different times so as to reduce the instantaneous demand for the pressured cleaning gas. The same cycling timer can be used to actuate the two cleanings in predetermined timed sequence, each cycle being initiated by the condition of only one of the compartments. Alternatively, a timer can be arranged for selective actuation by the condition of either compartment to only clean that compartment, the cycle itself making it impossible to respond to the condition of the compartment not being cleaned until after the cycle is terminated.

It is also helpful to split each compartment 104, 106 into two portions, all separately cleaned. This splitting further reduces the instantaneous load on the pressure gas supply inasmuch as only sixty jets can then be actuated at one time rather than one hundred twenty. Where practical construction considerations permit, the number of separately cleaned assemblies can be increased to the point where there are as many such assemblies as there are cleaning cycle periods in the length of time an assembly is to be used before cleaning becomes necessary. The cleaning cycles can then proceed sequentially through the individual assemblies and when all the assemblies have been cleaned, it will be time to start again through the cleaning sequence. Such an arrangement reduces the required size of gas accumulator or storage tanks, or can completely eliminate them.

The upper holders for the tubes, as shown in FIG. 1, are particularly desirable because they are easily manipulated to install or remove a tube. The mere unhooking or hooking of a chain is all that is needed. The packing 52 does the necessary sealing so that there is no dust leakage into the clean air chamber. The pressure nozzle 46 is closed off at its control valve (152 for example) so that no special sealing of the nozzle is needed. For high temperature use, the packing can be punched discs of glass cloth, polytetrafluoroethylene resin of polytrifluoromonochloroethylene resin, or the like.

The can lid type of tube end mounting can also be used with filter tubes that have no pressure jet connection, in which case the lid is left unperforated.

The anchoring structure for the lower ends of the tubes can be of any desired form or configuration. If the simple mounting advantages of the upper end of the tube are not desired, it too can be mounted in other ways. The nozzle 46 should not project into the tubes to any distance greater than one to three inches for six inch diameter tubes. Further penetrations may cause the inwardly drawn upper tube ends to contact and chafe against the nozzle during cleaning.

Obviously many modifications and variations of the present invention are possible in the light of the above teachings. It is, therefore, to be understood that within the scope of the appended claims the invention may be practiced otherwise than as specifically described.

What is claimed:

1. A filter for removing suspended dust from a stream of gas comprising in combination a housing, an elongated filter tube of yieldable textile wall construction endwise supported in a substantially vertical position in said housing and connected to receive the stream of gas at its lower end, and to cause said stream of gas to pass through the tube wall while the dust is trapped on the inner surface of said tube wall, a downwardly directed substantially rigid gas nozzle in the upper end of the tube, and connection elements for intermittently connecting the nozzle to a source of gas under pressure to cause the nozzle to direct the compressed gas downwardly at the tube's inner surface to loosen the dust trapped thereon and to cause the compressed gas stream to develop inwardly directed pressure around the top portion of the tube, the mounting of the tube providing a tension sufficiently low to allow this inwardly directed pressure to draw the top of the tube inwardly and thereby speed up the loosening of the dust, the gas nozzle being out of reach of the inwardly drawn tube, and a separate reverse gas flow mechanism is connected to direct gas flow inwardly in reverse direction through said tube wall from said housing around it when the compressed gas is introduced.

2. The combination of claim 1 in which the filter tube has a glass fiber wall.

3. The combination of claim 1 in which the filter tube is at least 8 feet long.

4. A filter for removing suspended dust from a stream of hot gas, said filter having an elongated filter tube of glass fiber textile, the tube being supported in a generally upright position in a housing for the passage of said gas through the wall of said tube and the trapping of the dust in the gas by said wall, the upper end of the tube being crimped in a groove formed in a generally flat sheet member having an opening through its flat portion, said generally flat sheet member being stiff enough to hold said upper tube end in position and carrying a flexible support element secured within the housing for supporting anchorage to a nozzle conduit means, a gas nozzle fitting to said nozzle conduit means and directed downwardly through said opening in said flat sheet member into said tube, the nozzle conduit means being connected to said nozzle externally of the tube top to supply said nozzle with gas under pressure.

5. The combination of claim 4 in which the nozzle is a loose fit through the opening in the sheet member, the conduit means includes a horizontally extending section of pipe, and the flexible support element is a chain that passes over that section of pipe.

6. The combination of claim 4 in which the nozzle is a loose fit through the opening in the sheet member, and the sheet member has high-temperature packing around the opening sufficiently tightly fitted to minimize leakage of dust-carrying hot gas.

7. A method for cleaning the dust-laden inside surface of a generally vertically directed elongated textile dust filter tube, said method being characterized by having said tube supported only at its ends, its upper end encircling and spaced from a susbtantially rigid downwardly directed nozzle, the tube being a little slack in its support, momentarily introducing through said nozzle a downwardly directed jet of compressed gas to cause the jet to loosen the dust on the inner surface of said tube and causing the upper end of said tube to be drawn inwardly to help loosen the collected dust, subjecting the tube to a flow of gas through its wall from outside to inside during the introduction of the jet, said nozzle being thin enough to keep out of contact with the tube at all times, and repeating the momentary introduction of compressed gas immediately after said tube recovers from the inwardly drawn condition, allowing sufficient time for the loosened dust to settle out.

References Cited by the Examiner

UNITED STATES PATENTS

| | | | |
|---|---|---|---|
| 673,547 | 5/01 | Prinz | 55—341 |
| 1,118,044 | 11/14 | Playter | 55—300 |
| 2,154,773 | 4/39 | Reed | 55—468 |
| 2,429,751 | 10/47 | Gohr et al. | 55—302 X |
| 2,667,941 | 2/54 | Ekstrom | 55—111 |
| 2,774,443 | 12/56 | Slayter | 55/379 |
| 2,804,168 | 8/57 | Church | 55—302 |
| 2,805,731 | 9/57 | Kron | 55—375 |

FOREIGN PATENTS

| | | |
|---|---|---|
| 183,946 | 4/07 | Germany. |
| 618,685 | 2/49 | Great Britain. |
| 255,947 | 2/49 | Switzerland. |
| 838,108 | 5/52 | Germany. |
| 827,314 | 1/52 | Germany. |
| 812,244 | 4/59 | Great Britain. |
| 125,118 | 5/59 | Russia. |

HARRY B. THORNTON, *Primary Examiner.*

HERBERT L. MARTIN, WALTER BERLOWITZ, ARNOLD RUEGG, WESLEY COLE, *Examiners.*